United States Patent [19]

Broniewski

[11] 4,305,793
[45] * Dec. 15, 1981

[54] METHOD OF CONCENTRATING ALKALI METAL HYDROXIDE IN HYBRID CELLS HAVING CATION SELECTIVE MEMBRANES

[76] Inventor: Bogdan M. Broniewski, 2527 Alta Vista Dr., Newport Beach, Calif. 92660

[*] Notice: The portion of the term of this patent subsequent to Jan. 20, 1998, has been disclaimed.

[21] Appl. No.: 149,502

[22] Filed: May 13, 1980

Related U.S. Application Data

[63] Continuation-in-part of Ser. No. 86,941, Oct. 22, 1979, Pat. No. 4,246,078, which is a continuation of Ser. No. 32,466, Apr. 23, 1979, abandoned.

[51] Int. Cl.³ .................... C25B 1/34; C25B 5/00; C25B 9/00
[52] U.S. Cl. .................... 204/98; 204/128; 204/263; 204/265; 204/266; 204/269; 204/270; 204/DIG. 4; 429/17; 429/21; 429/34
[58] Field of Search .................. 204/98, 128, DIG. 4, 204/263, 265, 266, 269, 270; 429/17, 21, 34

[56] References Cited

U.S. PATENT DOCUMENTS

| 3,262,868 | 7/1966 | Juda | 204/98 |
| 3,600,228 | 8/1971 | La Conti | 429/21 |
| 4,246,078 | 1/1981 | Broniewski | 204/98 |

Primary Examiner—R. L. Andrews

[57] ABSTRACT

Alkali metal hydroxide solutions are purified and concentrated by electrolysis of such solutions in the anode compartment of a hybrid cell comprising an anode compartment and a cathode compartment separated by a cation permeable diffusion barrier. To enable operation, gaseous hydrogen is supplied to the anode, oxygen to the cathode and an aqueous media receptive to alkali metal ions to the cathode compartment. A plurality of the hybrid cells may be operated in hydrodynamic series.

49 Claims, 5 Drawing Figures

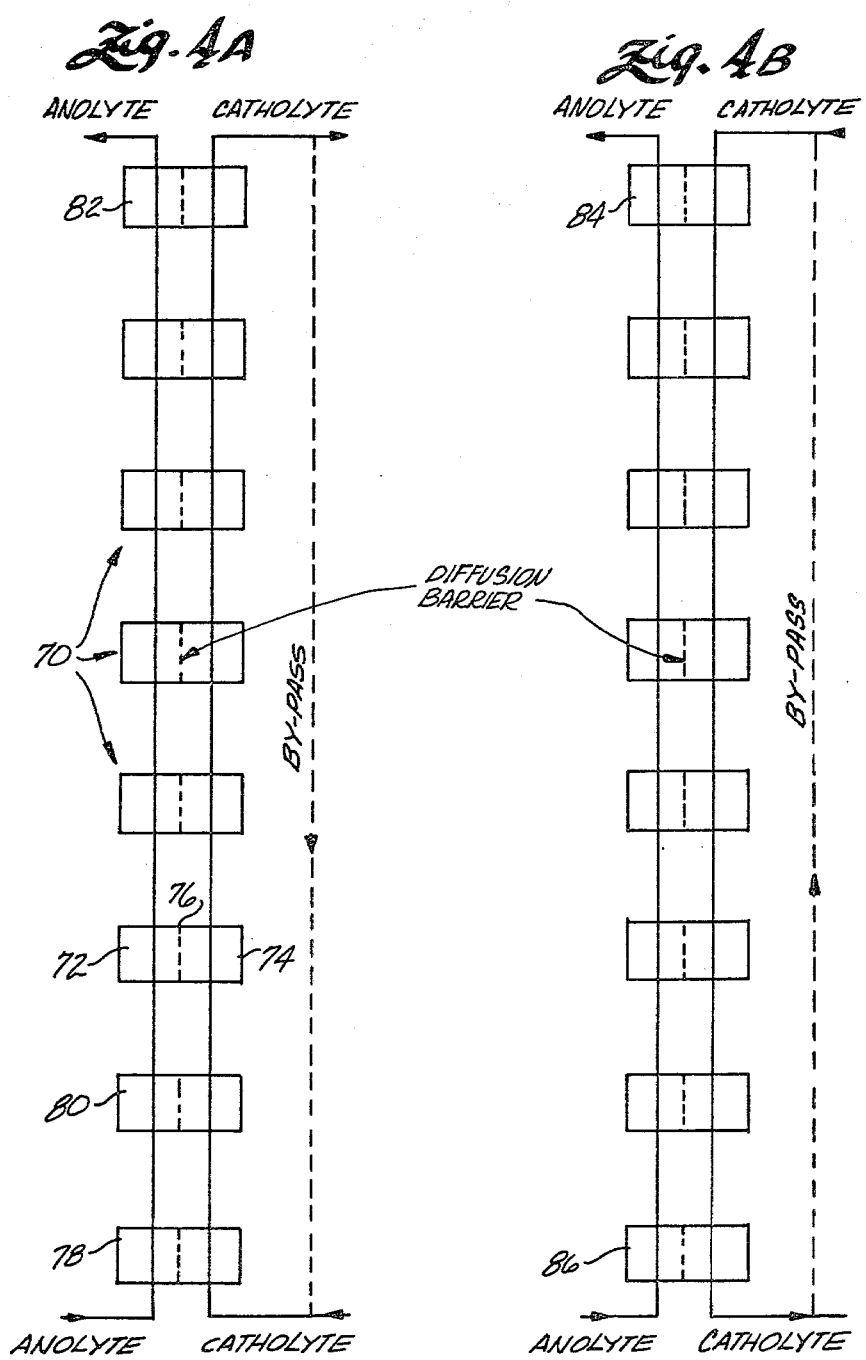

METHOD OF CONCENTRATING ALKALI METAL HYDROXIDE IN HYBRID CELLS HAVING CATION SELECTIVE MEMBRANES

CROSS-REFERENCE TO RELATED APPLICATIONS

This application is a continuation-in-part of copending Application Ser. No. 086,941, filed Oct. 22, 1979, now U.S. Pat. No. 4,246,078, which is a continuation of U.S. Application Ser. No. 032,466, filed Apr. 23, 1979, now abandoned.

BACKGROUND OF THE INVENTION

The present invention relates to electrochemical processes for production of chlorine and caustic from brine and to the simultaneous production of electrical energy. More particularly, the invention is directed to the treatment of cell liquor from a chloralkali cell to separate the sodium ions from the cell liquor and concentrate them in another liquor to form a sodium hydroxide solution.

The production of chlorine and crude caustic solutions by electrolysis of brine is a major industry. Two types of electrolysis cells are used in the production of chlorine and caustic. They are the diaphragm cell and the mercury cell. Membrane cells are also used to a minor but growing extent. Considerable quantities of energy are required for electrolysis of the brine to produce chlorine and subsequent treatment of the cell liquor resulting from electrolysis in diaphragm cells is necessary to obtain caustic solutions of the desired purity and concentration. A 50 weight percent aqueous caustic solution of low sodium chloride content is a commercially desired product.

Known processes for electrolysis of brine in diaphragm, mercury and membrane cells produce cathode cell liquors having a caustic content of from about 10 to as high as about 40 percent by weight in membrane cells and 50 percent by weight in mercury cells. The Sodium chloride content of the liquor is up to about 15 percent by weight for diaphragm cells and, virtually none for membrane cells and mercury cells. Mercury cells have environmental problems and are no longer the technology of choice in industrialized countries. The cathode cell liquor produced by a diaphragm cell typically contains about 10 to 12 percent by weight caustic (NaOH) and 15 percent by weight sodium chloride (NaCl).

In the diaphragm cell, brine is continuously fed to an anode compartment, where chlorine is produced, and then flows through a diaphragm, usually made of asbestos, to a cathode compartment. Hydrogen gas is discharged from the solution at the cathode, with attendant generation of hydroxyl ions. To minimize back-migration of hydroxide ions from the cathode compartment to the anode compartment, a positive flow rate from the anode compartment to the cathode compartment is always maintained; that is, a flow in excess of the conversion rate. As a consequence, the resulting catholyte solution, i.e., the cathode cell liquor as the term is used herein, has unconsumed sodium chloride in addition to product sodium hydroxide. The cathode cell liquor containing the sodium hydroxide and sodium chloride must be purified and must be concentrated to obtain a saleable caustic solution.

A membrane cell, which employs a membrane selectively permeable to certain cations in place of a diaphragm, yields a catholyte of low salt content and having a caustic content of up to about 40 percent by weight. The highly corrosive chlorine medium, however, is harsh on membrane materials. Accordingly, specifications for the membrane must be rigid and the membranes useful in the presence of chlorine are quite expensive. In addition, voltage drop within the membrane cell is relatively high which increases consumption of electricity. In sum, membrane cells are costly in regard to investment and operating costs.

Typical processes for concentrating cell liquor and separating the sodium chloride from the caustic involve evaporation and crystallization with the consumption of large amounts of steam and, consequently, fuel required to generate steam. Investment in such processes is considerable.

One solution to the problem of obtaining cell liquor having high caustic concentration is described in U.S. Pat. No. 3,899,403 to Cook, Jr., et al. A three-compartment electrolytic cell produces solutions of high and low caustic concentration. A two-compartment cell then concentrates the solution of low caustic concentration. Current efficiency in the two-compartment cell is lower than that in the three-compartment cell.

U.S. Pat. No. 4,036,717 to Babinsky et al describes a three-chamber electrolytic cell for concentrating and purifying cell liquor containing sodium or potassium hydroxide. The Babinsky cell has a porous catalytic anode, a porous asbestos diaphragm between the anode chamber and a central chamber, and a cation-permselective membrane between the central chamber and the cathode chamber. Cell liquor is passed through the central chamber and concentrated caustic is withdrawn from the cathode chamber. Hydrogen gas generated by the electrolysis is supplied to the anode to decrease the potential across the cell below the evolution potential for chlorine and coincidentally reduce the power requirements for the cell.

The use of hydrogen-air fuel cells to consume hydrogen gas from chloralkali cells and to produce electricity for a powering a portion of the chloralkali cells is described in Canadian Pat. No. 642,449. In the process described, hydrogen formed by the electrolysis of brine in a chloralkali cell is fed to the anode of a fuel cell and air is fed to the cathode. The fuel cell employs an aqueous electrolyte of sodium or potassium hydroxide having a concentration of 5 to 50 weight percent. There is no suggestion in the patent that the cell liquor from the chloralkali cells can be purified or concentrated by using such cell liquor as the electrolyte in the fuel cell.

U.S. Pat. No. 3,511,712 to Giner describes a process for removing carbon dioxide from gas streams using a fuel cell. An alkali metal carbonate solution formed by absorption of carbon dioxide is introduced to the anode compartment of a fuel cell operating by consumption of an oxidant and a fuel to generate hydrogen ions, consume hydroxyl ions and generate electricity. Operation decreases the pH of the electrolyte in the vicinity of the anode to a point where carbon dioxide is evolved with a simultaneous increase of pH. This restores the carbon dioxide absorptive capacity of the solution. The patent does not suggest the use of a fuel cell to purify and concentrate chloralkali cell liquor and, in fact, the Giner process would not be suitable for the treatment of cell liquor because the required lowering of the anolyte pH to 9 results in polarization of the anode and a severe lowering of the current efficiency of the cell.

SUMMARY OF THE INVENTION

In accordance with the present invention, there is provided a process for the simultaneous production of alkali metal hydroxide and the generation of electrical energy using a hybrid cell. The invention is particularly directed to forming a purified and concentrated caustic solution from the effluent of a chloralkali cell with attendant generation of electrical energy for use by the chloralkali cell.

In the process of the invention, an aqueous solution of at least one alkali metal hydroxide is introduced, as anolyte, between a first surface of a gas diffusion anode and a first surface of a diffusion barrier and an aqueous fluid medium receptive to alkali metal ions is introduced, as catholyte between a first surface of a gas diffusion cathode and a second surface of the diffusion barrier. Hydrogen gas is supplied to a second surface of the gas diffusion anode and an oxygen-containing gas is supplied to a second surface of the gas diffusion cathode. Alkali metal cations are caused to pass from the anolyte through the cation selective diffusion barrier and into the catholyte by electically interconnecting the gas diffusion anode and the gas diffusion cathode through an external load. A catholyte, which is more concentrated in alkali metal hydroxide than the aqueous solution of alkali metal hydroxide introduced between the gas diffusion anode and the diffusion barrier, is withdrawn from between the gas diffusion cathode and the diffusion barrier and an anolyte, which is less concentrated in alkali metal hydroxide than the aqueous solution of alkali metal hydroxide introduced between the gas diffusion anode and the diffusion barrier, is withdrawn from between the gas diffusion anode and the diffusion barrier.

More particularly, in the process of the invention, an aqueous solution of at least one alkali metal hydroxide is introduced, as anolyte, to an anode compartment of at least one hybrid cell which is comprised of a gas diffusion type anode, a gas diffusion type cathode and a diffusion barrier selectively permeable to cations. The anode, cathode and the diffusion barrier have first and second surfaces. The first surface of the anode and the first surface of the diffusion barrier define the anode compartment. The first surface of the cathode and the second surface of the diffusion barrier define an cathode compartment. The anode and cathode compartments have an inlet and an outlet. The anolyte flows from the inlet to the outlet of the anode compartment. A flow of catholyte, which is an aqueous fluid medium receptive to alkali metal ions, is introduced into the inlet of the cathode compartment. A flow of current from the cathode through an external load to the anode is generated by oxidation of hydrogen supplied to the second surface of the anode and by generation of hydroxide ions by reduction of an oxygen-containing gas supplied to the second surface of the cathode. Under conditions of current flow, some alkali metal ions selectively pass from the anolyte, through the diffusion barrier, and into the catholyte. The metal ions form, with cathode generated hydroxide ions, an alkali metal hydroxide solution. Catholyte, which is more concentrated in alkali metal hydroxide solution than the aqueous fluid medium introduced to the cathode compartment, is withdrawn from the outlet of the cathode compartment. Anolyte, depleted in alkali metal hydroxide, is withdrawn from the outlet of the anode compartment.

Concentration of the alkali metal hydroxide in the receptive aqueous media occurs as a consequence of cation transfer, electrolytic consumption of water with reduction of oxygen at the cathode to form hydroxyl ions, and evaporation of water through the cathode into air. Air, the most economical supply of oxygen, is passed over the cathode surface opposite to the cathode surface in contact with the catholyte, i.e., the second cathode surface.

In sum, separation of alkali metal ions from the solution introduced to the anode compartment occurs by alkali metal ions migrating through the diffusion barrier and concentration of caustic in the cathode compartment occurs by diffusion and electrolytic consumption of water with reduction of oxygen and evaporation of water.

The net result of the process is to cause the aqueous solution of alkali metal hydroxide, as it passes through the anode compartment, to be continuously depleted of hydroxide ions, and alkali metal ions for ionic neutrality, resulting in an alkali metal ion and hydroxide concentration gradient existing between the inlet and outlet of the anode compartment. As a consequence of acceptance of alkali metal ions by the aqueous media passing through the cathode compartment and generation of hydroxide ions by reduction of oxygen, the aqueous media becomes more concentrated in alkali metal hydroxide as it progresses through the cathode compartment. The catholyte leaves the cathode compartment as a solution more concentrated in alkali metal hydroxide than the aqueous media introduced to the cathode compartment.

The present invention, in its preferred application, is for the treatment of a chloralkali cell liquor to produce a purified and concentrated aqueous caustic solution. In this application, chloralkali cell liquor containing sodium hydroxide and sodium chloride is introduced into the anode compartment of a hybrid cell which preferably employs thin compartments. Hydrogen, generated by the chloralkali cell, is contacted with one surface of the gas diffusion anode of the hybrid cell. The hydrogen is oxidized at the anode with the production of water. The anode of the hybrid cell is separated from the cathode compartment by a diffusion barrier selectively permeable to cations, preferably a membrane.

Although the electrical energy generated as a consequence of the electrochemical oxidation and reduction reactions which occur in the hybrid cell may be fed to any load, it is advantageous to combine a number of hybrid cells in a circuit and feed the power output to a chloralkali cell to provide part of the electrical energy required to operate the chloralkali cell.

The following occurs in the hybrid cell when operated on chloralkali cell liquor: Sodium ions from the introduced chloralkali cell liquor pass transverse to the flow of the anolyte chloralkali cell liquor in the anode compartment through the diffusion barrier and into the catholyte flowing in the cathode compartment.

Hydroxyl ions generated as a consequence of reduction of oxygen at the cathode combine with the transferred sodium ions to form sodium hydroxide. Consumption of water by generation of hydroxyl ions also serves to concentrate the sodium hydroxide solution being formed in the cathode compartment. Additional concentration occurs by evaporation of water through the cathode into air passing over the surface of the cathode opposite to the surface in contact with the catholyte. This water evaporation also serves to cool the hybrid cell.

A plurality of hybrid cells may be staged in a cascade. The cells are operated hydrodynamically in series. The anolyte flows sequentially through the anode compartments of the hybrid cells. The catholyte flows sequentially through the cathode compartments of the hybrid cells. Each hybrid cell is operated under conditions which are effective for removing only a fraction of the alkali metal from the anolyte and concentrating it in the catholyte. The anolyte flow may be cocurrent or countercurrent to the catholyte flow. The fluids may either ascend or descend the cascade. The cascade may include a bypass connecting a cathode compartment outlet with the initial cathode compartment inlet to improve the conductivity of the catholyte by addition of some of the produced alkali metal hydroxide to the catholyte feed.

BRIEF DESCRIPTION OF THE DRAWINGS

The invention may be more clearly understood by reference to the drawings, wherein:

FIG. 4A is a schematic illustration of a cocurrent cascade of individual hybrid cells showing the sequence and arrangement of the cells in the cascade; and FIG. 4B is a schematic illustration of a countercurrent cascade of individual hybrid cells.

DETAILED DESCRIPTION

Alkali metal hydroxide solutions, especially solutions containing alkali metal halides, can be treated in accordance with this invention. For convenience of explanation, the feed solution typically has an alkali metal concentration between about 5 and 30 weight percent, calculated as the alkali metal hydroxide. Preferably, the solution is a chloralkali cell liquor, having a sodium hydroxide concentration of up to about 25 weight percent, preferably between about 10 and 25 weight percent sodium hydroxide, and up to about 26 weight percent sodium chloride, preferably up to about 15 percent by weight sodium chloride. Solutions of other alkali metal hydroxides, such as potassium hydroxide and lithium hydroxide, can also be treated. The cell liquor can also contain other alkali metal salts, such as sodium bromide, potassium iodide, and the like. The invention is adaptive to treating liquors from chloralkali cells, including diaphragm cells, membrane cells, and the like. Methods of operating such cells and the nature of the cell liquor produced in their operation are well known to those skilled in the art and have been described in an extensive body of technical publications and patents. Accordingly, the ensuing description will be directed primarily to the operation of the hybrid cells alone and in combination with chloralkali cells.

Figure 1:
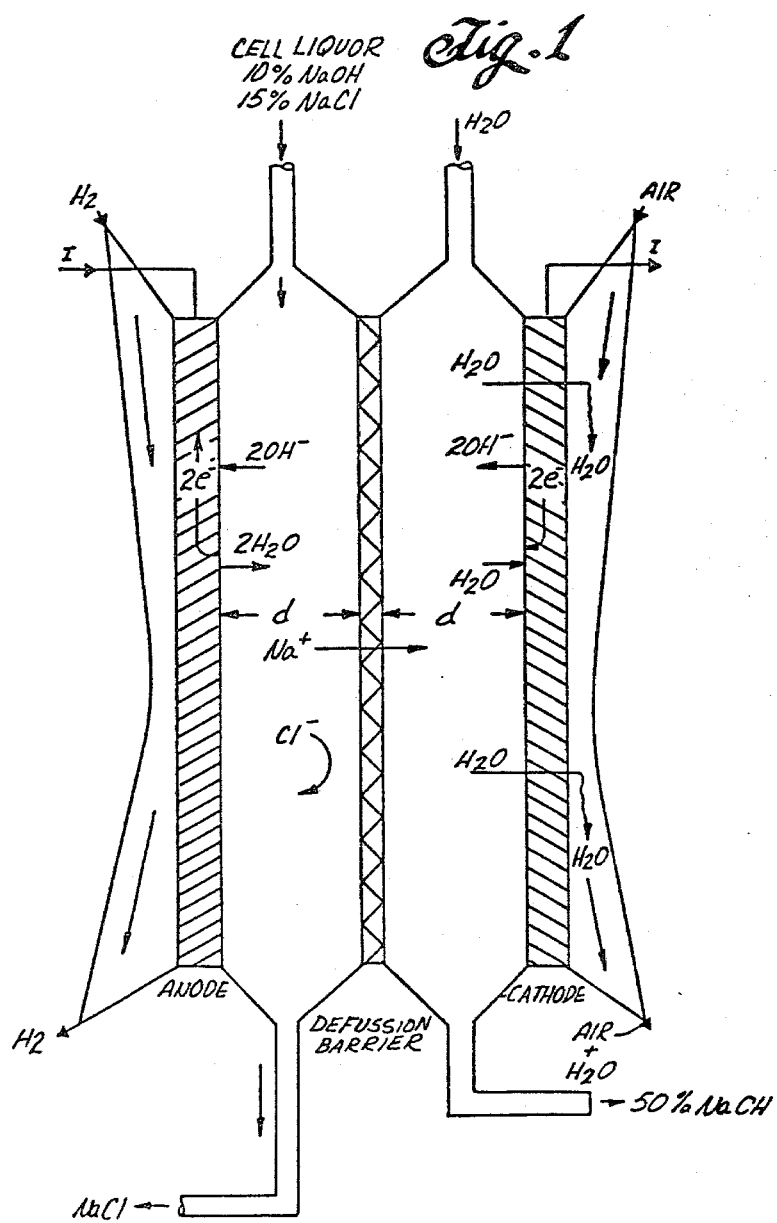
FIG. 1 is a schematic illustration of a hybrid cell used in practice of this invention.

FIG. 1 schematically depicts the operation of a two-compartment cell of this invention. A chloralkali cell liquor, containing about 10 weight percent NaOH and about 15 weight percent NaCl is introduced, as anolyte, into the anode compartment of the hybrid cell. The compartments of the hybrid cell are designed to provide flow substantially in one direction from inlet without appreciable mixing, back convection, or diffusion parallel to the electrodes of molecules and ions in the compartments. Preferably a condition of plug flow is maintained. This is more easily achieved when the average distance (d) between anode and diffusion barrier and diffusion barrier and cathode are respectively about 1 mm or less, typically about 0.1 mm to about 1 mm.

The cell liquor contacts a gas diffusion anode. Hydrogen gas from any source, and preferably from a chloralkali cell, contacts the opposite side of the anode. The anode provides a surface for intimate contact between the hydrogen gas and the anolyte.

Hydrogen gas undergoes an oxidation reaction with the anolyte hydroxide ion at the anode which may be schematically represented as:

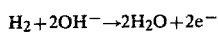

As the anolyte flows through the anode compartment, its hydroxide ion content is progressively reduced and its water content progressively increased.

Separating the anode compartment from the cathode compartment of FIG. 1 is a cation-permselective diffusion barrier, preferably a membrane. This is a diffusion barrier which is permeable to cations such as a sodium ion, but is relatively impermeable to anions such as the chloride ions. To maintain electroneutrality and to account for depletion of hydroxide ion from the anolyte, sodium ions, under condition of current flow through an external load, separate from the anolyte and pass through the cation-permselective barrier into a catholyte passing through the cathode compartment. Substantially all of the chloride ions remain in the anolyte, along with sufficient sodium ions to electrically balance the chloride ions.

The cathode compartment is separated from the anode compartment by the above-mentioned cation-permselective diffusion barrier. An aqueous medium such as water or a dilute ionic solution, which may be part of the solution drawn from the anode compartment, is introduced as catholyte into the cathode compartment and progressively picks up sodium ions moving through the diffusion barrier. The catholyte contacts one surface of a gas diffusion cathode where oxygen gas, preferably from air, undergoes a reduction reaction with the catholyte water which may be schematically represented as follows:

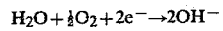

The generated hydroxide ions balance the sodium ions which enter the catholyte to form a caustic solution having increased caustic concentration in the direction of flow of the catholyte. Concentration is due in part to consumption of water at the cathode.

Contemporaneously, in the operation of the cell, some water from the catholyte evaporates at the opposite surface of the cathode into the air stream. For a given cathode surface area and permeability, the flow of air may be regulated to control evaporation of water from the surface of the cathode to modify the concentration of sodium hydroxide in the catholyte. In practice, the rate of addition of water to the cathode compartment, the rate of transport of water through the cation-permselective diffusion barrier into the catholyte, the rate of consumption of water at the cathode, and the rate of evaporation of water from the cathode, are all correlated so as to provide a product catholyte of desired caustic concentration.

Thus, when the cell liquor and the water introduced to the hybrid cell flow through their respective compartments concurrently, as shown in FIG. 1, the sodium hydroxide concentration of the relevant anolyte decreases from about 10–12% by weight at the appropriate inlet and approaches 0.5% or less at the outlet. The sodium hydroxide concentration of the relevant catholyte, by contrast, increases from about 0% at the appropriate inlet to about 40% or more at the outlet. High concentration differences are achievable with currently available membranes and barriers.

As indicated, the anolyte withdrawn from the anode compartment is substantially depleted of sodium hydroxide. However, even when the effluent from the anode compartment contains as little as 0.1 weight percent or 0.01 weight percent of sodium hydroxide, the pH of the effluent is high, i.e., above 12. The high pH of the effluent from the anode compartment is advantageous in that polarization and loss of current efficiency which can be associated with a change from an alkanine to a neutral or acid pH within the cell is minimized.

The process and hybrid cell illustrated in FIG. 1 can, of course, be used to treat cell liquors having differing concentrations of alkali metal hydroxide and alkali metal halide. By regulating the flow of water or dilute aqueous alkali hydroxide into the cathode compartment of FIG. 1, and by evaporation of water from the porous cathode, the concentration of the product flowing from the cathode compartment can be varied over a wide range. Thus, a range of concentrations of product alkali metal hydroxide can be achieved at will.

The hybrid cell can be arranged in a filter press type structure with a multitude of elementary hybrid cells connected in series forming a net hybrid cell.

Figure 2:
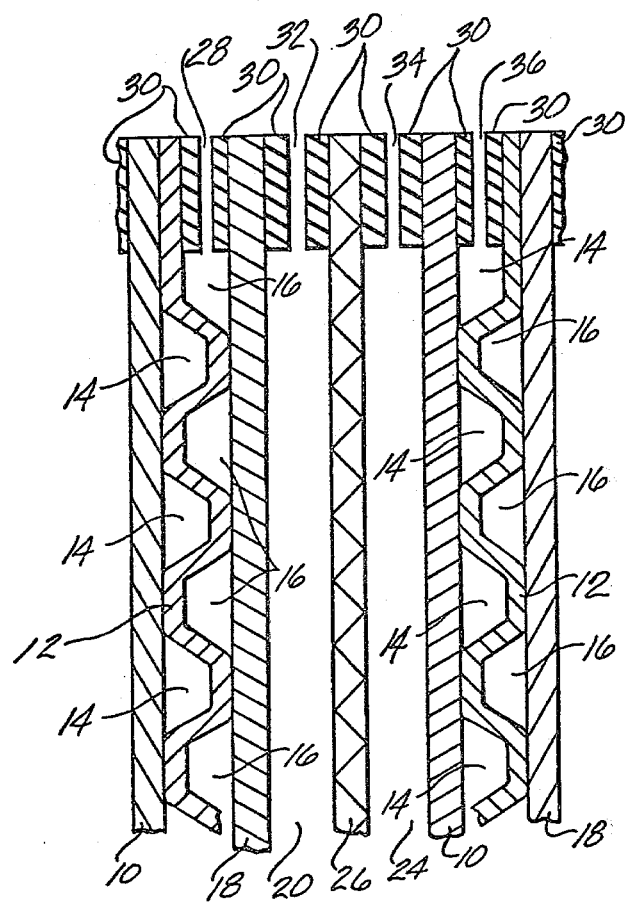
FIG. 2 is a partial cross-sectional view of a hybrid cell having a plurality of thin cell units.

FIG. 2 is a partial cross-sectional view of a portion of a filter press hybrid cell unit showing the sequence and arrangement of elements in the cell. There is provided gas diffusion cathodes 10 and electrically conductive gas separator and current collectors 12 which helps to define air channels 14 and hydrogen channels 16; gas diffusion anodes 18; anolyte compartment 20; catholyte compartment 24 and membrane 26. The following conduits are formed by insulating ported spacers 30. Conduit 28 serves hydrogen channels 16; conduit 32 is for the anolyte liquor to be processed; conduit 34 is for the aqueous catholyte media and conduit 36 is for the air fed to channels 14.

Given the sequence of elements, such variables as the thickness and spacing of elements, the shape of the air and hydrogen channels are subject to wide variation. In addition, many different materials of construction may be employed because the process of this invention is practiced under relatively mild conditions, particularly when compared with the highly oxidative and corrosive conditions found in a chloralkali cell. Thus, any material stable to alkali hydroxide and cell operating temperature may be used.

Materials of construction and cell construction arrangements are described, for instance, in U.S. Pat. Nos. 3,098,762; 3,196,048; 3,296,025; 3,511,712; 3,516,866; 3,530,003; 3,764,391; 3,899,403; 3,901,731; 3,957,535; 4,036,717 and 4,051,002 and British Patent Specifications Nos. 1,211,593 and 1,212,387, each incorporated herein by reference.

The cation permselective diffusion barriers may be perfluorosulfonic acid polymers manufactured by duPont under the trade name Nafion and perfluorocarboxylic acid polymers manufactured by Asahi Chemical Co. Other low cost membranes prepared from sulfonated polymers, carboxylated hydrocarbon polymers, phenolic resins, polyolefins and the like, may also be used.

Whatever the selected material, the membrane should preferably have a permselectivity in 40% NaOH of at least about 0.95, an ohmic resistance not more than about 3 ohm-cm and an electrosmotic coefficient of not more than about 74 gms of water per Faraday.

The gas diffusion anodes and cathodes currently employed in the fuel cell art may be used in the construction of the hybrid cells and are semi hydrophobic. They generally consist of a gas diffusion layer which may be catalytic per se or have catalytic properties induced or promoted by a noble metal and the like. A suitable gas diffusion type cathode and/or anode may be formed of activated carbon which may be promoted by a noble metal and combined with a support material such as Teflon TM.

The hybrid cell can be operated at any temperature which maintains the electrolytes in a liquid state and avoids the precipitation of dissolved constituents such as alkali metal halide or alkali metal hydroxide. Temperatures of from about 20° C. to 100° C., more preferably 40° C. to 70° C., may be employed. Because the cell liquor from a chloralkali cell is warm and because heat is generated within the fuel cell during its operation, it is necessary to cool the cell to maintain a desired operating temperature. The cell is conveniently cooled as an incidence of evaporation of water from the catholyte through the gas diffusin cathode into the stream of air which is passed across the surface of the cathode opposite to the surface in contact with the catholyte to supply oxygen to the cathode. In a filter press type of construction, the individual cells are so thin that there is excellent heat transfer between the anode, cathode, and fluid compartments.

To achieve effective cooling through the cathode by evaporation, it may be desirable to continuously introduce fresh, dry air into the hybrid cell at a point removed from the air intake which supplies the hybrid cell. Air can be dried conveniently by passing it over cooling coils or through desiccant such as silica gel in accordance with known methods. The flow of electrolytes through the compartments of the fuel cell can be cocurrent as shown in FIG. 1 or countercurrent. Cocurrent flow is presently preferred.

Air is the lowest cost source of oxygen required for the cathode and serves to carry off evaporated water. Other oxygen-containing gases as well as oxygen enriched air can also be used but at greater expense.

Figure 3:
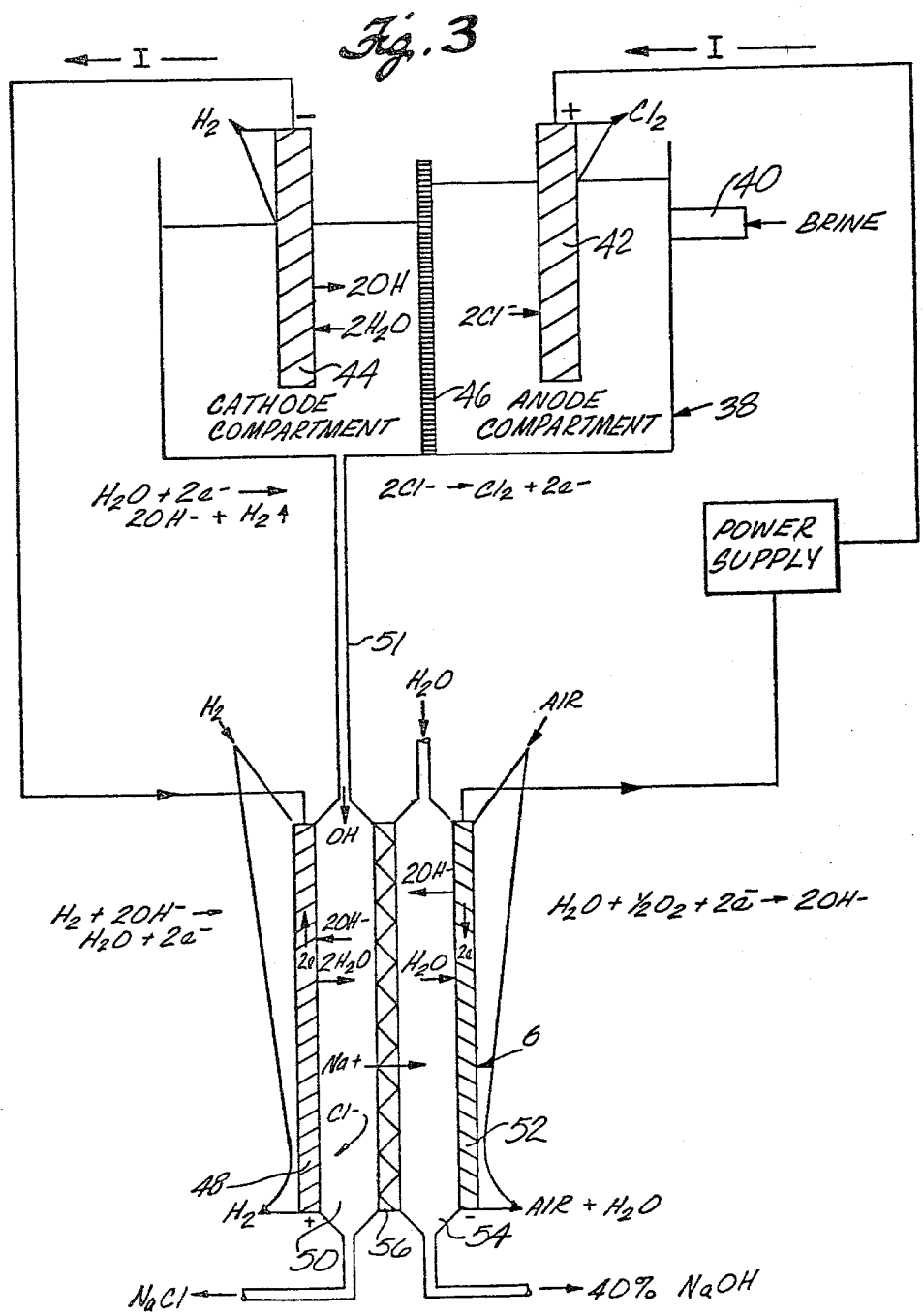
FIG. 3 is a flow diagram showing a chloralkali cell and a hybrid cell being operated in combination.

FIG. 3 shows the interrelationships between chloralkali cells and hybrid cells used to treat the cell liquor from the chloralkali cells in accordance with this invention. Brine is introduced to the chloralkali cell 38 by line 40. Chlorine is generated at anode 42 and hydrogen released at cathode 44. Diaphragm 46 separates the compartments. Hydrogen generated in the chloralkali cells is supplied to gas diffusion anode 48 of the hybrid cell 49 and cell liquor to anode compartment 50 by line 51. Air is supplied to the gas diffusion cathode 52 and water to cathode compartment 54. With current flow, as induced by reduction of oxygen at the cathode and oxidation of hydrogen at the anode, sodium ions pass through diffusion barrier 56 to the cathode compartment.

The hybrid cell of FIG. 3 is in series with the chloralkali cell and will produce a fraction of the power consumed by the chloralkali cell. Thus, while additional electric current from an outside source is required to operate the chloralkali cell and is shown as "power supply", the external energy required to operate the chloralkali cell is reduced.

In a typical operation of the hybrid cell, a cell liquor containing about 10 percent by weight NaOH and 15 percent by weight NaCl is supplied to anode compartment 50. Water is introduced to cathode compartment 54. The products withdrawn from the hybrid cell may be an approximately 15 to 22 percent by weight NaCl solution containing a small amount of NaOH from the anode compartment and a purified, substantially chloride-free 40 percent by weight NaOH solution from the appropriate cathode compartment.

Although the hybrid cell may be operated in such a manner as to remove substantially all of the alkali metal hydroxide from the cell liquor, as indicated, it can be more efficient to operate the cell so as to leave a small proportion of the sodium hydroxide in the effluent from the anode compartment. This is done to improve the efficiency of the hybrid cell.

The effluent from the anode compartment of a hybrid cell run at high efficiencies can be depleted down to an anolyte strength of around 2% alkali metal hydroxide and can then be fed to the anode compartment of another finishing hybrid cell operated under conditions which are effective for removing the last few percent of the alkali metal from the anolyte. The conditions in such a finishing cell can be regulated to produce concentrated alkali metal hydroxide product even though the feed to the anode compartment is relatively dilute. However, because the concentration of alkali metal hydroxide from such a dilute feed is accomplished at lower current efficiency than the concentration from more concentrated feed, the cell produces little or no useable power. In the latter case, the cell can be run essentially under short circuited conditions which are effective for concentrating the alkali metal hydroxide but produce no useable current. However, because the bulk of the separation was accomplished in the main hybrid cells under conditions providing higher current efficiency, the overall current efficiency of the process is not seriously diminished.

Although a main hybrid cell and a finishing cell may be operated in such a manner as to remove first the bulk and then the remainder of substantially all of the alkali metal hydroxide from the cell liquor, it can be more efficient to operate a cascade of hybrid cells hydrodynamically in series so as to remove only a small proportion of the sodium hydroxide in each anode compartment. When this is done, the current efficiency of the individual hybrid cells can be kept high to maximize the yield of electric current in each stage of the cascade.

FIG. 4A is a schematic illustration of a cocurrent cascade of individual hybrid cells showing the sequence and arrangement of the cells in the cascade while FIG. 4B illustrates countercurrent flow. There are provided individual hybrid cells 70 which may be either the two-compartment hybrid cells or the filter press type cells discussed previously. The individual cells include an anode compartment 72 separated from a cathode compartment 74 by a diffusion barrier 76, are preferably stacked in a vertical cascade and are operated hydrodynamically in series. With reference to FIG. 4A, cell liquor from a chloralkali cell is introduced as anolyte to the inlet of the anode compartment of a hybrid cell 78 at one end of the cascade. The anolyte flows through the anode compartment and is partially depleted of alkali metal hydroxide. The effluent from the anode compartment is withdrawn from the outlet and is introduced as anolyte into the anode compartment inlet of a second hybrid cell 80. The anolyte passes through the remainder of the cascade in this manner. The effluent withdrawn from the anode compartment of the hybrid cell 82 at the other end of the cascade is substantially depleted of alkali metal hydroxide.

The catholyte also flows in series through the cells. The catholyte is introduced into the cathode compartment inlet of a hybrid cell 78 or 84 at one of the ends of the cascade. The catholyte is made to flow serially through the individual cathode compartments and is partially enriched ion alkali metal hydroxide during each stage of the cascade.

The catholyte withdrawn from the appropriate cathode compartment outlet at the opposite end of the cascade concontains a purified solution of caustic concentrated alkali metal hydroxide.

Each hybrid cell is operated under conditions which are effective for removing only a fraction of the alkali metal from the anolyte and concentrating it in the catholyte. The fraction may be determined by the number of cells operated in the cascade. Any number of stages can be employed in the cascade. There is no upper limit except for economies of cost and size required by the user. In the presently preferred embodiments, eight to ten stages are used.

Consequently, in the cascade, as distinguished from a single hybrid cell or the filter press hybrid cell systems previously described, each individual anode operates under a proportionately smaller anolyte concentration gradient between the inlet and outlet of the anode compartment. As a consequence voltage efficiency of the individual cells, and of the cascade as a whole, may be increased to its practical maximum using diffusion barriers commercially available. For hybrid cell cascades using these anodes, the greater the number of stages, the smaller the concentration gradient of alkali metal hydroxide in each stage, and the higher the voltage efficiency of the individual cells.

As depicted in FIG. 4A, both the anolyte and the catholyte enter the cascade in the same stage. Cocurrent flow maintains a condition of plug flow in the compartments to minimize any cross diffusion of caustic related to membrane imperfections such as holes, for example.

FIG. 4B depicts a countercurrent cascade of indivudal hybrid cells. As depicted in FIG. 4B, the anolyte and the catholyte enter at opposite ends of the cascade. Hybrid cell 84 at one end of the cascade serves both as the final stage for the anolyte and as the initial stage for the catholyte. The concentrations of sodium hydroxide in this cell are at their minimum values: e.g. anolyte at 0.5% NaOH or less, catholyte at about 10% NaOH.

In hybrid cell 86 at the opposite end of the cascade, which serves as the initial stage for the anolyte and as the final stage for the catholyte, sodium hydroxide concentrations are maximized: anolyte at about 10% NaOH, catholyte at about 40% NaOH. However, within a countercurrent cascade, as compared to a cocurrent cascade, there is the least possible average difference in caustic concentration across the diffusion barriers. Countercurrent circulation may be practiced to minimize concentration differences of the caustic across the diffusion barrier of each cell. As concentration gradients increase across the diffusion barrier, chemical driving forces are thought to promote back-diffusion of the caustic product from a high strength catholyte to the lower strength anolyte, which reduces the concentration of sodium hydroxide in the product and the overall efficiency of the process. Many commercially available diffusion barriers, such as the membranes discussed previously, exhibit a decrease in permselectivity at concentration differences across the membrane above about 30% by weight caustic which affects efficiency. A countercurrent circulation may increase efficiency and product purity by minimizing the average concentration differential of sodium hydroxide throughout the cascade.

The cascade may be operated with either ascending or descending electrolytes for cocurrent circulation modes. A countercurrent cascade may be operated either with an ascending anolyte or an ascending catholyte.

A bypass, shown in both FIG. 4A and FIG. 4B, may be included to provide flow of product catholyte from the last catholyte stage of the cascade to the feed of the first catholyte stage. It may be desirable to add a small portion of product catholyte to the catholyte entering the cascade, which may be pure water, to increase its conductivity. Feed strengths ranging from around 0 to around 25 percent by weight NaOH, preferably between about 10 and about 15 percent by weight, are representative of bypass caustic provided for efficient operation.

Although the present invention has been described with reference to particular details and embodiments thereof, these details are intended to illustrate the invention, the scope of which is defined in the following claims.

What is claimed is:

1. A process for production of concentrated alkali metal hydroxide aqueous solution and electrical energy utilizing a plurality of hybrid cells operated hydrodynamically in series, each hybrid cell having an anode compartment and a cathode compartment separated by a diffusion barrier which is selectively permeable to cations, each said anode compartment being defined, in part, by a first surface of a gas diffusion anode and a first surface of a diffusion barrier, each said cathode compartment being defined, in part, by a first surface of a gas diffusion cathode and a second surface of a diffusion barrier, the plurality of hybrid cells including a first hybrid cell at one end of the series and a last hybrid cell at an opposite end of the series, said process comprising the steps of:

(a) introducing the flow of an aqueous alkaline metal hydroxide solution as anolyte to the anode compartment of said first hybrid cell, said anolyte flowing through the anode compartments of the hybrid cells in sequence from the first hybrid cell to the last hybrid cell of the series;

(b) introducing flow of an aqueous fluid medium receptive to alkali metal ions as catholyte to the cathode compartment of said first hybrid cell, said catholyte flowing through the cathode compartments of the hybrid cells in sequence from the first hybrid cell to the last hybrid cell of the series, (c) supplying hydrogen gas to a second surface of each said gas diffusion anodes;

(d) supplying oxygen-containing gas to a second surface of each said gas diffusion cathodes;

(e) causing alkali metal cations to pass from the anolyte through each cation selective diffusion barrier into the catholyte by electrically interconnecting each gas diffusion and each gas diffusion cathode through an external load, thereby generating electrical energy by oxidation of the hydrogen gas supplied to each gas diffusion anode second surface and the reduction of the oxygen in the oxygen-containing gas supplied to each gas diffusion cathode second surface;

(f) withdrawing catholyte, which is more concentrated in respect to alkali metal hydroxide than the aqueous fluid medium introduced to the cathode compartment of the first hybrid cell of the series, from the cathode compartment of the last hybrid cell of the series; and, (g) withdrawing anolyte, which is more depleted in respect to alkali metal hydroxide than the aqueous solution introduced to the anode compartment of the first hybrid cell of the series, from the anode compartment of the last hybrid cell of the series.

2. A process as claimed in claim 1 in which catholyte from a hybrid cell of the series other than the first cell is introduced to the aqueous fluid medium introduced as cathoylte to the first hybrid cell of the series to increase the conductivity of the aqueous fluid medium feed as catholyte to the first hybrid cell of the series.

3. A process as claimed in claim 1 in which said anolyte introduced to the anode compartment of said first hybrid cell is a solution comprising up to about 25 percent by weight alkali metal hydroxide.

4. A process as claimed in claim 1 in which said anolyte withdrawn from the anode compartment of the last hybrid cell of the series contains alkali metal hydroxide in a concentration above about 0.01 percent by weight.

5. A process as claimed in claim 1 in which said anolyte withdrawn from the anode compartment of the last hybrid cell of the series contains alkali metal hydroxide in a concentration above about 0.5 percent by weight.

6. A process as claimed in claim 1 in which the catholyte withdrawn from the cathode compartment of the last hybrid cell of the series contains alkali metal hydroxide in an amount up to about 40 percent by weight.

7. A process as claimed in claim 6 in which said anolyte introduced to the anode compartment of said first hybrid cell is a solution comprising up to about 25 percent by weight alkali metal hydroxide.

8. A process as claimed in claim 6 in which said anolyte introduced to the anode compartment of said first hybrid cell is a solution comprising up to about 25 percent by weight sodium hydroxide and up to about 26 percent by weight sodium chloride.

9. A process as claimed in claim 1 in which the flow of anolyte through the anode compartments is substantially in one direction without appreciable mixing, back convection or diffusion of molecules and ions contained in said anolyte and the flow of catholyte through the cathode compartments is substantially in one direction without appreciable mixing, back convection or diffusion of molecules and ions contained in said catholyte.

10. A process as claimed in claim 1 in which a condition of plug flow is maintained in the anode and cathode compartments of the hybrid cells.

11. A process for production of concentrated alkali metal hydroxide aqueous solution and electrical energy utilizing a plurality of hybrid cells operated hydrodynamically in series, each hybrid cell having an anode compartment and a cathode compartment separated by a diffusion barrier which is selectively permeable to cations, each said anode compartment being defined, in part, by a first surface of a gas diffusion anode and a first surface of a diffusion barrier, each said cathode compartment being defined, in, part, by a first surface of a gas diffusion cathode and a second surface of a diffusion barrier, the plurality including a first hybrid cell at one end of the series and a last hybrid cell at an opposite end of the series;
   (a) introducing flow of an aqueous alkali metal hydroxide solution as anolyte to the anode compartment of said first hybrid cell, said anolyte flowing through the anode compartments of the hybrid cells in sequence from the first hybrid cell to the last hybrid cell of the series;
   (b) introducing flow of an aqueous fluid medium receptive to alkali metal ions as catholyte to the cathode compartment of the last hybrid, said catholyte flowing through the cathode compartments of the hybrid cells in sequence from the last hybrid cell of the series to the first hybrid cell of the series;
   (c) supplying hydrogen gas to a second surface of each said gas diffusion anodes;
   (d) supplying oxygen-containing gas to a second surface of each said gas diffusion cathodes;
   (e) causing alkali metal cations to pass from the anolyte through each cation selective diffusion barrier into the catholyte by electrically interconnecting each gas diffusion anode and each gas diffusion cathode through an external load, thereby generating electrical energy by oxidation of the hydrogen gas supplied to each gas diffusion anode second surface and the reduction of the oxygen in the oxygen-containing gas supplied to each gas diffusion cathode second surface;
   (f) withdrawing catholyte, which is more concentrated in respect to alkali metal hydroxide than the aqueous fluid medium introduced to the cathode compartment of the last hybrid cell of the series, from the cathode compartment of the first hybrid cell of the series; and,
   (g) withdrawing anolyte, which is more depleted in respect to alkali metal hydroxide than the aqueous solution introduced to the anode compartment of the first hybrid cell of the series, from the anode compartment of the last hybrid cell of the series.

12. A process as claimed in claim 11 in which catholyte from a hybrid cell of the series other than the last cell is introduced to the aqueous fluid medium introduced as catholyte to the last hybrid cell of the series to increase the conductivity of the aqueous fluid medium feed as catholyte to the last hybrid cell of the series.

13. A process as claimed in claim 11 in which said anolyte introduced to the anode compartment of said first hybrid cell is a solution comprising up to about 25 percent by weight alkali metal hydroxide.

14. A process as claimed in claim 11 in which said anolyte withdrawn from the anode compartment of the last hybrid cell of the series contains alkali metal hydroxide in a concentration above about 0.01 percent by weight.

15. A process as claimed in claim 11 in which said anolyte withdrawn from the anode compartment of the last hybrid cell of the series contains alkali metal hydroxide in a concentration above about 0.5 percent by weight.

16. A process as claimed in claim 11 in which the catholyte withdrawn from the cathode compartment of the first hybrid cell of the series contains alkali metal hydroxide in an amount up to about 40 percent by weight.

17. A process as claimed in claim 11 in which the flow of anolyte through the anode compartments is substantially in one direction without appreciable mixing, back convection or diffusion of molecules and ions contained in said anolyte and the flow of catholyte through the cathode compartments is substantially in one direction without appreciable mixing, back conversation or diffusion of molecules and ions contained in said catholyte.

18. A process as claimed in claim 16 in which said anolyte introduced to the anode compartment of said first hybrid cell is a solution comprising up to about 25 percent by weight sodium hydroxide and up to about 26 percent by weight sodium chloride.

19. A process as claimed in claim 11 in which the flow of anolyte through the anode compartments and the flow of catholyte through the cathode compartments are respectively substantially in one direction without appreciable mixing, back convection or diffusion of molecules and ions contained in said anolyte and catholyte.

20. A process as claimed in claim 11 in which a condition of plug flow is maintained in the anode and cathode compartments of the hybrid cells.

21. A process for production of concentrated alkali metal hydroxide aqueous solution and electrical energy comprising the steps of:
   (a) introducing flow of an aqueous alkali metal hydroxide solution as anolyte between a first surface of a gas diffusion anode and a first surface of a diffusion barrier, said diffusion barrier being selectively permeable to cations;
   (b) introducing flow of an aqueous fluid medium receptive to alkali metal ions as catholyte between a first surface of a gas diffusion cathode and a second surface of a said diffusion barrier;
   (c) supplying hydrogen gas to a second surface of said diffusion anode;
   (d) supplying oxygen-containing gas to a second surface of said gas diffusion cathode;
   (e) causing alkali metal cations to pass from the anolyte through the cation selective diffusion barrier and into the catholyte by electrically interconnecting the gas diffusion anode and the gas diffusion cathode through an external load, thereby generating electrical energy by oxidation of the hydrogen gas supplied to the gas diffusion anode second surface and reduction of the oxygen-containing gas supplied to the gas diffusion cathode second surface;
   (f) withdrawing, from between the gas diffusion cathode first surface and the diffusion barrier second surface, a concentrated alkali metal hydroxide aqueous solution.

22. A process for production of concentrated alkali metal hydroxide aqueous solution and electrical energy comprising the steps of:
   (a) introducing flow of an aqueous alkali metal hydroxide solution as anolyte between a first surface of a gas diffusion anode and a first surface of a diffusion barrier, said diffusion barrier being selectively permeable to cations;
   (b) introducing flow of an aqueous fluid medium receptive to alkali metal ions as catholyte between a first surface of a gas diffusion cathode and a second surface of a said diffusion barrier;
   (c) supplying hydrogen gas to a second surface of said diffusion anode;

(d) supplying oxygen-containing gas to a second surface of said gas diffusion cathode;

(e) causing alkali metal cations to pass from the anolyte through the cation selective diffusion barrier and into the catholyte by electrically interconnecting the gas diffusion anode and the gas diffusion cathode through an external load, thereby generating electrical energy by oxidation of the hydrogen gas supplied to the gas diffusion anode second surface and reduction of the oxygen in the oxygen-containing gas supplied to the gas diffusion cathode second surface;

(f) withdrawing, from between the gas diffusion cathode first surface and the diffusion barrier second surface, a catholyte, which is more concentrated in alkali metal hydroxide than the aqueous alkali metal hydroxide solution introduced between the gas diffusion anode first surface and the diffusion barrier first surface; and, (g) withdrawing, from between the gas diffusion anode first surface and the diffusion barrier first surface, and anolyte, which is less concentrated in alkali metal hydroxide than the aqueous alkali metal hydroxide solution introduced between the gas diffusion anode first surface and the diffusion barrier first surface.

23. The process of claim 22 in which the oxygen-containing gas comprises air.

24. The process of claim 23 wherein the air supplied to the gas diffusion cathode second surface is of sufficient quantity to pass thereover and concentrate the catholyte flowing between the gas diffusion cathode first surface and the diffusion barrier second surface by removing water passing through said gas diffusion cathode, said water being removed by evaporation from said gas diffusion cathode second surface.

25. The process of claim 22 wherein the aqueous alkali metal hydroxide solution introduced between the anode first surface and the diffusion barrier is a solution comprising up to approximately 25 percent by weight alkali metal hydroxide.

26. The process of claim 25 wherein the anolyte withdrawn from between the anode first surface and the diffusion barrier first surface contains alkali metal hydroxide in a concentration above about 0.01 percent by weight.

27. The process of claim 25 wherein the anolyte withdrawn from between the anode first surface and the diffusion barrier first surface contains alkali metal hydroxide in a concentration above about 0.5 percent by weight.

28. The process of claim 22 wherein the catholyte withdrawn from between the cathode first surface and the diffusion barrier second surface contains alkali metal hydroxide in an amount up to approximately 40 percent by weight.

29. The process of claim 28 wherein the aqueous alkali metal hydroxide solution introduced between the anode first surface and the diffusion barrier first surface is a solution comprising up to approximately 25 percent by weight alkali metal hydroxide.

30. The process of claim 22 wherein the flow of anolyte between the gas diffusion anode first surface and the diffusion barrier first surface is substantially in one direction without appreciable mixing, back convection or diffusion of molecules and ions contained in said anolyte, and the flow of catholyte between the gas diffusion cathode first surface and the diffusion barrier second surface is substantially in one direction without appreciable mixing, back convection or diffusion of molecules and ions contained in said catholyte.

31. The process of claim 22 wherein the flow of anolyte and the flow of catholyte are both plug flow in nature.

32. A process for production of concentrated sodium hydroxide solution from the aqueous effluent of a chloralkali cell and electrical energy comprising the steps of:

(a) introducing flow of said chloralkali cell aqueous effluent as anolyte between a first surface of a gas diffusion anode and a first surface of a diffusion barrier, said diffusion barrier being selectively permeable to sodium ions, said chloralkali aqueous effluent including sodium hydroxide and sodium chloride;

(b) introducing flow of an aqueous fluid medium receptive to sodium ions as catholyte between a first surface of a gas diffusion cathode and a second surface of said diffusion barrier;

(c) supplying hydrogen gas to a second surface of said gas diffusion anode;

(d) supplying oxygen-containing gas to a second surface of said gas diffusion cathode;

(e) causing sodium ions to pass from the anolyte through the sodium ion selective diffusion barrier and into the catholyte by electrically interconnecting the gas diffusion anode and the gas diffusion cathode to the chloralkali cell, thereby generating electrical energy by oxidation of the hydrogen gas supplied to the gas diffusion anode second surface and reduction of the oxygen in the oxygen-containing gas supplied to the gas diffusion cathode second surface;

(f) withdrawing, from between the gas diffusion cathode first surface and the diffusion barrier second surface, catholyte, which is more concentrated in sodium hydroxide than the aqueous effluent of said chloralkali cell introduced between the gas diffusion anode first surface and the diffusion barrier first surface; and, (g) withdrawing, from between the gas diffusion anode first surface and the diffusion barrier first surface, anolyte, which is less concentrated in sodium hydroxide than the aqueous effluent of said chloralkali cell introduced between the gas diffusion anode first surface and the diffusion barrier first surface.

33. The process of claim 32 wherein the oxygen-containing gas comprises air.

34. The process of claim 32 wherein the air supplied to the gas diffusion cathode second surface is of sufficient quantity to pass thereover and concentrate the catholyte flowing between the gas diffusion cathode first surface and the diffusion barrier second surface by removing water passing through said gas diffusion cathode, said water being removed by evaporation from said gas diffusion cathode second surface.

35. The process of claim 32 wherein the chloralkali aqueous effluent comprises up to approximately 25 percent by weight sodium hydroxide and up to approximately 15 percent by weight sodium chloride.

36. The process of claim 35 wherein the anolyte withdrawn from between the gas diffusion anode first surface and the diffusion barrier first surface contains sodium hydroxide in concentration above approximately 0.01 percent by weight.

37. The process of claim 32 wherein the catholyte withdrawn from between the gas diffusion cathode first surface and the diffusion barrier second surface contains sodium hydroxide an amount up to approximately 40 percent by weight.

38. The process of claim 32 wherein the hydrogen supplied to the gas diffusion second surface is generated by the chloralkali cell.

39. A process for production of concentrated alkali metal hydroxide aqueous solution and electrical energy utilizing at least one hybrid cell having an anode compartment and a cathode compartment separated by a diffusion barrier which is selectively permeable to cations, said anode compartment being defined, in part, by a first surface of a gas diffusion anode and a first surface of the diffusion barrier, said cathode compartment being defined, in part, by a first surface of a gas diffusion cathode and a second surface of the diffusion barrier, said process comprising the steps of:

(a) introducing flow of an aqueous alkaline metal hydroxide solution as anolyte into said anode compartment;

(b) introducing flow of an aqueous fluid medium receptive to alkali metal ions as catholyte into said cathode compartment;

(c) supplying hydrogen gas to a second surface of said gas diffusion anode;

(d) supplying oxygen-containing gas to second surface of said gas diffusion cathode;

(e) causing alkali metal cations to pass from the anolyte through the cation selective diffusion barrier into the catholyte by electrically interconnecting the gas diffusion anode and the gas diffusion cathode through an external load, thereby generating electrical energy by oxidation of the hydrogen gas supplied to the gas diffusion anode second surface and the reduction of the oxygen in the oxygen-containing gas supplied to the gas diffusion cathode second surface;

(f) withdrawing, from said cathode compartment, catholyte which is more concentrated in alkali metal hydroxide than the aqueous alkali metal hydroxide solution introduced into the anode compartment; and, (g) withdrawing, from said anode compartment, anolyte which is less concentrated in alkali metal hydroxide than the aqueous alkali metal hydroxide solution introduced into the anode compartment.

40. A process for production of concentrated alkali metal aqueous solution from the aqueous effluent of a chloralkali cell and electrical energy utilizing at least one hybrid cell having an anode compartment and a cathode compartment separated by a diffusion barrier which is selectively permeable to cations, said anode compartment being defined, in part, by a first surface of a gas diffusion anode and a first surface of the diffusion barrier, said cathode compartment being defined, in part, by a first surface of a gas diffusion cathode and a second surface of the diffusion barrier, said process comprising the steps of:

(a) introducing flow of the chloralkali cell aqueous effluent as anolyte into said anode compartment, said chloralkali cell aqueous effluent comprising sodium hydroxide and sodium chloride;

(b) introducing flow of an aqueous fluid medium receptive to sodium ions as catholyte into said cathode compartment;

(c) supplying hydrogen gas generated by said chloralkali cell to a second surface of said gas diffusion anode;

(d) supplying air to a second surface of said gas diffusion cathode;

(e) causing sodium ions to pass from the anolyte through the cation selective diffusion barrier into the catholyte by electrically interconnecting the gas diffusion anode and the gas diffusion cathode to the chloralkali cell thereby generating electrical energy by oxidation of the hydrogen gas supplied to the gas diffusion and reduction of oxygen gas from the air supplied to the gas diffusion cathode;

(f) withdrawing, from said cathode compartment, catholyte which is more concentrated in sodium hydroxide than the aqueous effluent from the chloralkali cell introduced into the anode compartment; and, (g) withdrawing, from said anode compartment, anolyte which is less concentrated in sodium hydroxide than the aqueous effluent from the chloralkali cell introduced into the anode compartment.

41. Apparatus for the production of concentrated alkali metal hydroxide solution and electrical energy comprising:

(a) a gas diffusion anode having a first and a second surface;

(b) a gas diffusion cathode having a first and a second surface;

(c) a diffusion barrier having a first and a second surface, said diffusion barrier being selectively permeable to cations and disposed between said gas diffusion anode first surface and said gas diffusion cathode first surface;

(d) means for introducing flow of an aqueous alkali metal hydroxide solution as anolyte between the gas diffusion anode first surface and the diffusion barrier first surface;

(e) means for introducing flow of an aqueous fluid medium receptive to alkali metal ions as catholyte between the gas diffusion cathode first surface and the diffusion barrier second surface;

(f) means for supplying hydrogen gas to the gas diffusion anode second surface;

(g) means for supplying oxygen-containing gas to the gas diffusion cathode second surface;

(h) means for causing alkali metal cations to pass from the anolyte through the cation selective diffusion barrier and into the catholyte by electrically interconnecting the gas diffusion anode and the gas diffusion cathode through an external load, thereby generating electrical energy by oxidation of the hydrogen gas supplied to the gas diffusion anode second surface and reduction of the oxygen in the oxygen-containing gas to the gas diffusion cathode second surface;

(i) means for withdrawing, from between the gas diffusion cathode first surface and the diffusion barrier second surface, a concentrated alkali metal hydroxide solution.

42. Apparatus for the production of concentrated alkali metal hydroxide solution and electrical energy comprising:

(a) a gas diffusion anode having a first and a second surface;

(b) a gas diffusion cathode having a first and a second surface;

(c) a diffusion barrier having a first and a second surface, said diffusion barrier being selectively permeable to cations and disposed between said gas diffusion anode first surface and said gas diffusion cathode first surface;

(d) means for introducing flow of an aqueous alkali metal hydroxide solution as anolyte between the gas diffusion anode first surface and the diffusion barrier first surface;

(e) means for introducing flow of an aqueous fluid medium receptive to alkali metal ions as catholyte between the gas diffusion cathode first surface and the diffusion barrier second surface;

(f) means for supplying hydrogen gas to the gas diffusion anode second surface;

(g) means for supplying oxygen-containing gas to the gas diffusion cathode second surface;

(h) means for causing alkali metal cations to pass from the anolyte through the cation selective diffusion barrier and into the catholyte by electrically interconnecting the gas diffusion anode and the gas diffusion cathode through an external load, thereby generating electrical energy by oxidation of the hydrogen gas supplied to the gas diffusion anode second surface and reduction of the oxygen in the oxygen-containing gas to the gas diffusion cathode second surface;

(i) means for withdrawing, from between the gas diffusion cathode first surface and the diffusion barrier second surface, a catholyte, which is more concentrated in alkali metal hydroxide than the aqueous alkali metal hydroxide solution introduced between the gas diffusion anode first surface and the diffusion barrier first surface; and, (g) means for withdrawing, from between the diffusion anode first surface and the diffusion barrier first surface, an anolyte, which is less concentrated in alkali metal hydroxide than the aqueous alkali metal hydroxide solution introduced between the gas diffusion anode first surface and the diffusion barrier first surface.

43. The apparatus of claim 42 wherein the gas diffusion anode first surface and the diffusion barrier first surface are spaced apart for causing the flow of alkali metal hydroxide solution therebetween to be substantially in one direction without appreciable mixing, back convection or diffusion of molecules and ions contained in the alkali metal hydroxide solution, and wherein the diffusion barrier second surface and the gas diffusion cathode first surface are spaced apart for causing the flow of the aqueous fluid medium therebetween to be substantially in one direction without appreciable mixing, back convection or diffusion of molecules and ions contained in the aqueous fluid medium.

44. The apparatus of claim 42 wherein the gas diffusion anode first surface and the diffusion barrier first surface are spaced apart for causing the flow of alkali metal hydroxide solution therebetween to be plug type flow and wherein the diffusion barrier second surface and the gas diffusion cathode first surface are spaced apart for causing the flow of the aqueous fluid medium therebetween to be plug type flow.

45. The apparatus of claim 42 wherein said means for supplying hydrogen gas to the gas diffusion anode second surface and said means for supplying oxygen-containing gas to the gas diffusion cathode second surface both include means for forming channels adjacent to the gas diffusion anode second surface and the gas diffusion cathode second surface respectively.

46. Apparatus for the production of concentrated alkali metal hydroxide solution and electrical energy comprising a plurality of hybrid cells connected hydrodynamically in series, each hybrid cell comprising:

(a) a gas diffusion anode having a first and a second surface;

(b) a gas diffusion cathode having a first and a second surface;

(c) a diffusion barrier which is selectively permeable to cations and having a first and a second surface, said gas diffusion anode first surface and said diffusion barrier first surface defining, in part, an anode compartment, and said gas diffusion cathode first surface and said diffusion barrier second surface defining, in part, a cathode compartment;

(d) means for introducing flow of an alkaline metal hydroxide solution, as anolyte, into said anode compartment;

(e) means for introducing flow of an aqueous fluid medium receptive to alkali metal ions, as catholyte, into said cathode compartment;

(f) means for supplying hydrogen gas to the gas diffusion anode second surface;

(g) means for supplying oxygen-containing gas to the gas diffusion cathode second surface;

(h) means, electrically interconnecting the gas diffusion anode and the gas diffusion cathode through an external load for causing alkali metal cations to pass from the anolyte through the cation selective diffusion barrier into the catholyte, thereby generating electrical energy by oxidation of the hydrogen gas supplied to the gas diffusion anode second surface and the reduction of the oxygen in the oxygen-containing gas supplied to the gas diffusion cathode second surface;

(i) means for withdrawing, from said cathode compartment, catholyte which is more concentrated in alkali metal hydroxide than the alkali metal hydroxide solution introduced into the anode compartment; and (j) means for withdrawing, from said anode compartment, anolyte which is less concentrated in alkali metal hydroxide than the aqueous solution of alkali metal hydroxide introduced into the anode compartment.

47. The apparatus of claim 46 wherein the plurality of hybrid cells includes a first hybrid cell at one end of the series and a last hybrid cell at an opposite end of the series and, said means for introducing flow of an alkali metal hydroxide solution is operative for introducing said alkali metal hydroxide solution into an anode compartment of said first hybrid cell, said alkali metal hydroxide solution flowing therethrough and thereafter flowing through anode compartments of the hybrid cells in the hydrodynamic series and into an anode compartment of the last hybrid cell, said means for introducing flow of an aqueous fluid medium is operative for introducing said aqueous fluid medium into a cathode compartment of said first hybrid cell, said aqueous fluid medium flowing therethrough and thereafter flowing through cathode compartments of the hybrid cells in the hydrodynamic series and into a cathode compartment of the last hybrid cell, said means for withdrawing catholyte is operative for withdrawing catholyte from the cathode compartment of last hybrid cell; and said means for withdrawing anolyte is operative for withdrawing anolyte from the anode compartment of last hybrid cell.

48. The apparatus of claim 46 wherein the plurality of hybrid cells includes a first hybrid cell at one end of the series and a last hybrid cell at an opposite end of the series and, said means for introducing flow of an alkali metal hydroxide solution is operative for introducing said alkali metal hydroxide solution into an anode compartment of said first hybrid cell, said alkali metal hydroxide solution flowing therethrough and thereafter flowing through anode compartments of the hybrid cells in the hydrodynamic series and into an anode compartment of the last hybrid cell;

said means for introducing flow of an aqueous fluid medium is operative for introducing said aqueous fluid medium into a cathode compartment of said last hybrid cell, said aqueous fluid medium flowing therethrough and thereafter flowing through cathode compartments of the hybrid cells in the hydrodynamic series and into a cathode compartment of the first hybrid cell, said means for withdrawing catholyte is operative for withdrawing catholyte from the first hybrid cell; and said means for withdrawing anolyte is operative for withdrawing anolyte from the last hybrid cell.

49. Apparatus for the production of concentrated alkali metal hydroxide, comprising, in combination:
 (a) a chloralkali cell having an anode, cathode, and a cathode compartment, said cathode compartment being configured for containing an aqueous alkali metal hydroxide solution and including outlet means for withdrawing said aqueous alkali metal hydroxide solution from the chloralkali cell cathode compartment;
 (b) a hybrid cell comprising,
  (i) a gas diffusion anode having a first and a second surface;
  (ii) a gas diffusion cathode having a first and a second surface;
  (iii) a diffusion barrier having a first and a second surface, said diffusion barrier being selectively permeable to cations and disposed between said gas diffusion anode first surface and said gas diffusion cathode first surface;
 (c) means, interconnected with the chloralkali cell cathode compartment outlet means for introducing flow of the aqueous alkali metal hydroxide solution from the chloralkali cell as anolyte between the gas diffusion anode first surface and the diffusion barrier first surface;
 (d) means for introducing flow of an aqueous fluid medium receptive to alkali metal ions as catholyte between the gas diffusion cathode first surface and the diffusion barrier second surface;
 (e) means interconnected with said chloralkali cell anode for withdrawing hydrogen gas therefrom and supplying said hydrogen gas to the gas diffusion anode second surface;
 (f) means for supplying oxygen-containing gas to the gas diffusion cathode second surface;
 (g) means for causing alkali metal cations to pass from the anolyte through the cation selective diffusion barrier and into the catholyte by electrically interconnecting the gas diffusion anode to the chloralkali cell cathode and the gas diffusion cathode to the chloralkali cell anode, thereby generating electrical energy by oxidation of the hydrogen gas supplied to the gas diffusion anode second surface and reduction of the oxygen in the oxygen-containing gas supplied to the gas diffusion cathode second surface;
 (h) means for withdrawing, from between the gas diffusion cathode first surface and the diffusion barrier second surface, a catholyte which is more concentrated in alkali metal hydroxide than the alkali metal hydroxide solution introduced between the gas diffusion anode first surface and the diffusion barrier first surface; and
 (i) means for withdrawing from between the gas diffusion anode first surface and the diffusion barrier first surface, an anolyte, which is less concentrated in alkali metal hydroxide than the aqueous solution of alkali metal hydroxide introduced between the gas diffusion anode first surface and the diffusion barrier first surface.

* * * * *